(12) United States Patent
Yamaguchi et al.

(10) Patent No.: US 6,326,711 B1
(45) Date of Patent: *Dec. 4, 2001

(54) DC BRUSHLESS MOTOR HAVING ECCENTRIC ROTOR

(75) Inventors: Tadao Yamaguchi; Naohisa Koyanagi, both of Isesaki (JP)

(73) Assignee: Tokyo Parts Industrial Co., Ltd., Isesaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,689

(22) Filed: Sep. 7, 1999

(51) Int. Cl.[7] ....................................................... H02K 7/65
(52) U.S. Cl. ........................................... 310/81; 310/67 R
(58) Field of Search ................................. 310/81, 67 R, 310/90, 156, 51; 74/61

(56) References Cited

U.S. PATENT DOCUMENTS

| | | | |
|---|---|---|---|
| 4,570,093 | * | 2/1986 | Morii et al. ............................. 310/46 |
| 4,647,803 | * | 3/1987 | Von Der Heide et al. ............ 310/51 |
| 5,391,952 | * | 2/1995 | Simazu et al. ...................... 310/67 R |
| 5,698,919 | * | 12/1997 | Obara ...................................... 310/90 |
| 5,942,833 | * | 8/1999 | Yamaguchi .......................... 310/368 |

FOREIGN PATENT DOCUMENTS

| | | | |
|---|---|---|---|
| 4-49832 | * | 2/1992 | (JP) ........................................ 310/81 |
| 10-248203 | * | 9/1998 | (JP) ........................................ 310/81 |
| 11-098761 | * | 4/1999 | (JP) ........................................ 310/81 |

* cited by examiner

Primary Examiner—Karl Tamai
(74) Attorney, Agent, or Firm—Leydig, Voit & Mayer, Ltd.

(57) ABSTRACT

A dc brushless vibrator motor has a base member, a shaft connected to the base member, a stator having magnetically conductive cores and respective armature coils angularly uniformly disposed about the shaft and having an eccentric mass distribution. The rotor has a magnet holder, an annular permanent magnet fixedly connected to the magnet holder and concentric with the shaft and radially outside the stator. The magnet has alternating north and south magnetic poles arranged at a uniform angular pitch. In order to rotationally imbalance the rotor, an arcuate weight is fixed to the magnet holder and/or a part of the magnet holder is cut out.

9 Claims, 7 Drawing Sheets

DC BRUSHLESS MOTOR HAVING ECCENTRIC ROTOR

BACKGROUND OF THE INVENTION

1. Field of the Invention

This invention relates to a self-vibrating dc-operated brushless vibrator motor used for a pocketable wireless alerting or communication device such as a pager or a portable phone. The motor has a rotor having eccentric mass distribution that causes vibration.

2. Description of the Prior Art

A typical prior known dc vibrator motor has an eccentric weight made of a tungsten alloy fixedly mounted on an output shaft of the motor. The motor vibrates as the shaft rotates because of the unbalanced distribution of the mass of the rotor about the rotational axis.

However, a danger of mechanical interference pertains to this type of vibrator motor because of the existence of the externally rotating eccentric weight. In addition, the alerting device requires an extra space in which the eccentric weight rotates, and the high density material for the weight, such as tungsten alloy, is costly.

As disclosed in U.S. Pat. No. 5,036,239 (issued Jul. 30, 1991, one of the present applicants invented a flat coreless dc vibrator motor having neither output shaft nor external weight. This vibrator motor has a rotor which incorporates generally sector shaped non-overlapping flat armature coils arranged angularly partially about the shaft of the rotor, so that the center of mass of the rotor is off the rotational axis of the rotor.

As disclosed in U.S. Pat. No. 5,107,155 (issued Apr. 21, 1992), the same applicant of the present invention invented a dc vibrator motor without an output shaft. This vibrator motor has a fixed shaft on which a cylindrical magnet is fixedly mounted, and an eccentrically-weighted rotor having a cylindrical coreless winding, enclosing the fixed magnet, is mounted on the fixed shaft. The rotor has either eccentric bearings or a combination of eccentric bearings and eccentric weights, so that the center of mass of the rotor is off its rotational axis. Although the motor has been favorably accepted in the market, the rotor of this motor requires a substantial number of production process steps.

As disclosed in U.S. Pat. No. 5,341,057 (issued Aug. 23, 1994), the present applicants and another inventor jointly invented an additional dc vibrator motor without an output shaft. This vibrator motor has an eccentric armature rotor having three-pole armature iron cores and coils that are all situated within an angular range of 180° about its rotational axis.

A sector-shaped eccentric armature rotor having all of the armature poles within an angular range of 180° provides a good mass imbalance. However, the iron armature cores of the motor disclosed in U.S. Pat. No. 5,341,057 cause a cogging torque, a magnetic sticking effect, and, therefore, requires comparatively high voltage for starting.

Furthermore, all of the above vibrator motors disclosed in the U.S. patents have commutator brushes, thereby giving rise to a life span problem.

As disclosed in U.S. Pat. No. 5,373,207 (issued Dec. 13, 1994), the present applicants invented a dc brushless vibrator motor having neither an output shaft nor brushes. This vibrator motor employs a cylindrically-shaped coreless stator winding unit having at least three stator coils arranged at an even pitch angle and a rotor including an axially extended eccentrically-weighted permanent magnet having alternating north and south poles, angled partially, about the rotational axis. The rotor additionally includes a tubular yoke to provide magnetic flux paths.

SUMMARY OF THE INVENTION

It is a primary object of the present invention to provide a light, compact dc brushless vibrator motor having an eccentrically-weighted rotor.

It is an additional object of the present invention to provide a vibrator motor having a cored stator, but simple in construction and low in production cost.

In order to achieve the above objects, a dc brushless vibrator motor according to the present invention has a base member, a shaft connected to the base member, the shaft having a longitudinal center axis, a stator fixedly connected to the base member, the stator having plurality of magnetically conductive cores angularly evenly disposed about the center axis and respective armature coils mounted thereon, a rotor mounted on the shaft having an eccentric mass distribution with respect to the center axis. The rotor has a magnet holder, an annular permanent magnet fixedly connected to the magnet holder and disposed concentrically with the center axis and radially outside the stator. The annular magnet has alternate north and south magnetic poles arranged at an even angular pitch about the center axis. The magnet holder has a top generally flat part disposed orthogonal to the center axis.

In one embodiment, that magnet holder has a cylindrical side wall disposed concentrically with the center axis and the rotor has an arcuate weight fixed to the cylindrical side wall on the inside thereof but radially outside the annular magnet. The flat top part of the magnet holder has a plurality of through-holes so as to reduce the weight of the magnet holder. The magnet holder further has an arcuate groove between its cylindrical side wall and the annular magnet in a manner that the arcuate weight and the arcuate groove are disposed angularly 180° about the center axis in angularly non-overlapping relation with each other. The magnet holder may be made of a low-friction type synthetic resin and be rotatably mounted on the shaft in a manner that the resin-made magnet holder is in a direct sliding contact with the shaft.

In other embodiments, the magnet holder has a cutout, which may be a through-hole in a top flat part thereof, in a manner that the magnet holder per se has an eccentric mass distribution with respect to the center axis. The annular magnet is totally or partially adjoined by a part of the magnet holder on radially outside thereof. The rotor may have an arcuate weight fixedly attached to the magnet holder in a manner that the arcuate weight and the cutout in the magnetic holder are disposed diametrically opposite to each other with respect to the center axis so that the eccentric mass distribution about the center axis is enhanced. The magnet holder in these embodiments is made of a magnetically conductive material, but it may alternatively be made of a synthetic resin. The vibrator motor of these embodiments further has a cup-like stationary rotor cover fixed to the base member in a manner that rotor is protectively capped with the rotor cover.

DETAILED DESCRIPTION OF THE PREFERRED EMBODIMENTS

The invention will now be described in detail with reference to the drawings.

Figure 1:
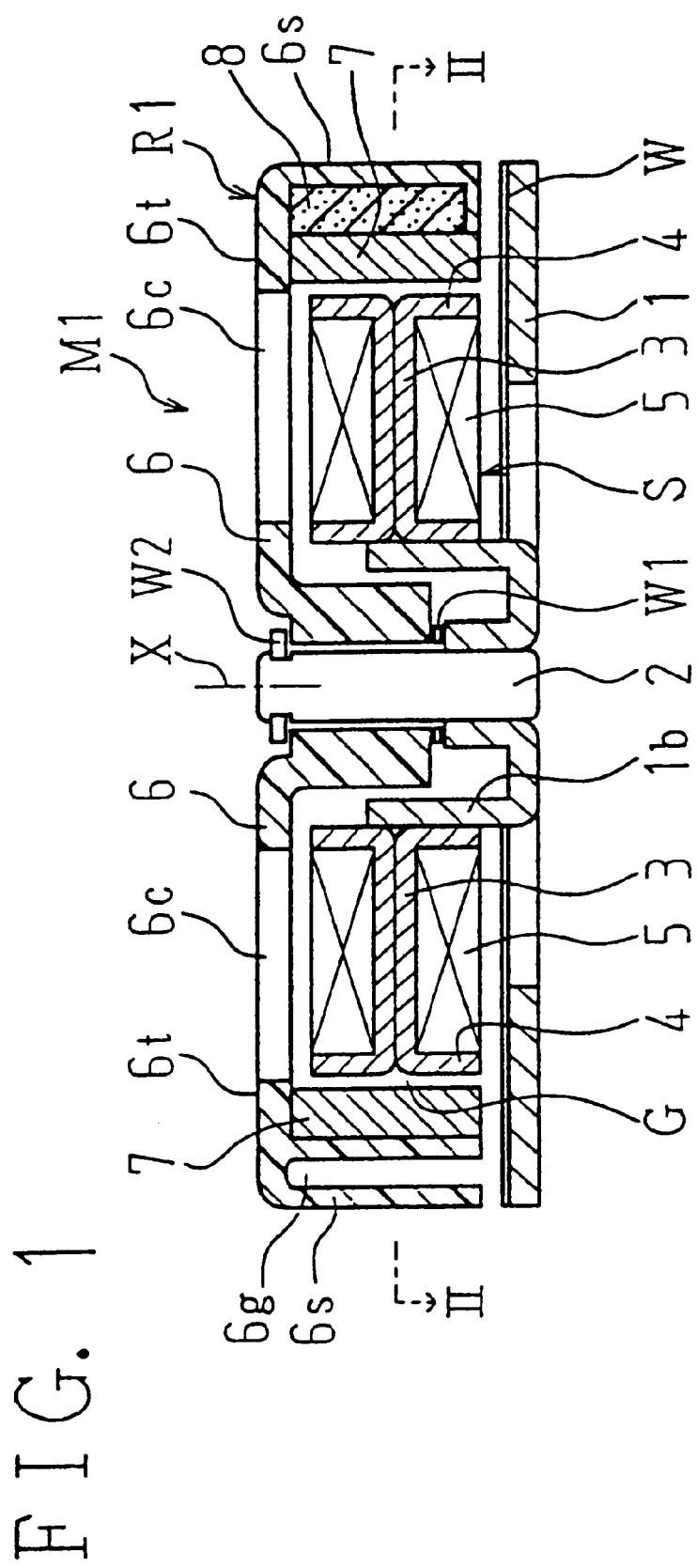
FIG. 1 is a vertical sectional view of a vibrator motor of the fir embodiment according to the present invention.
Figure 2:
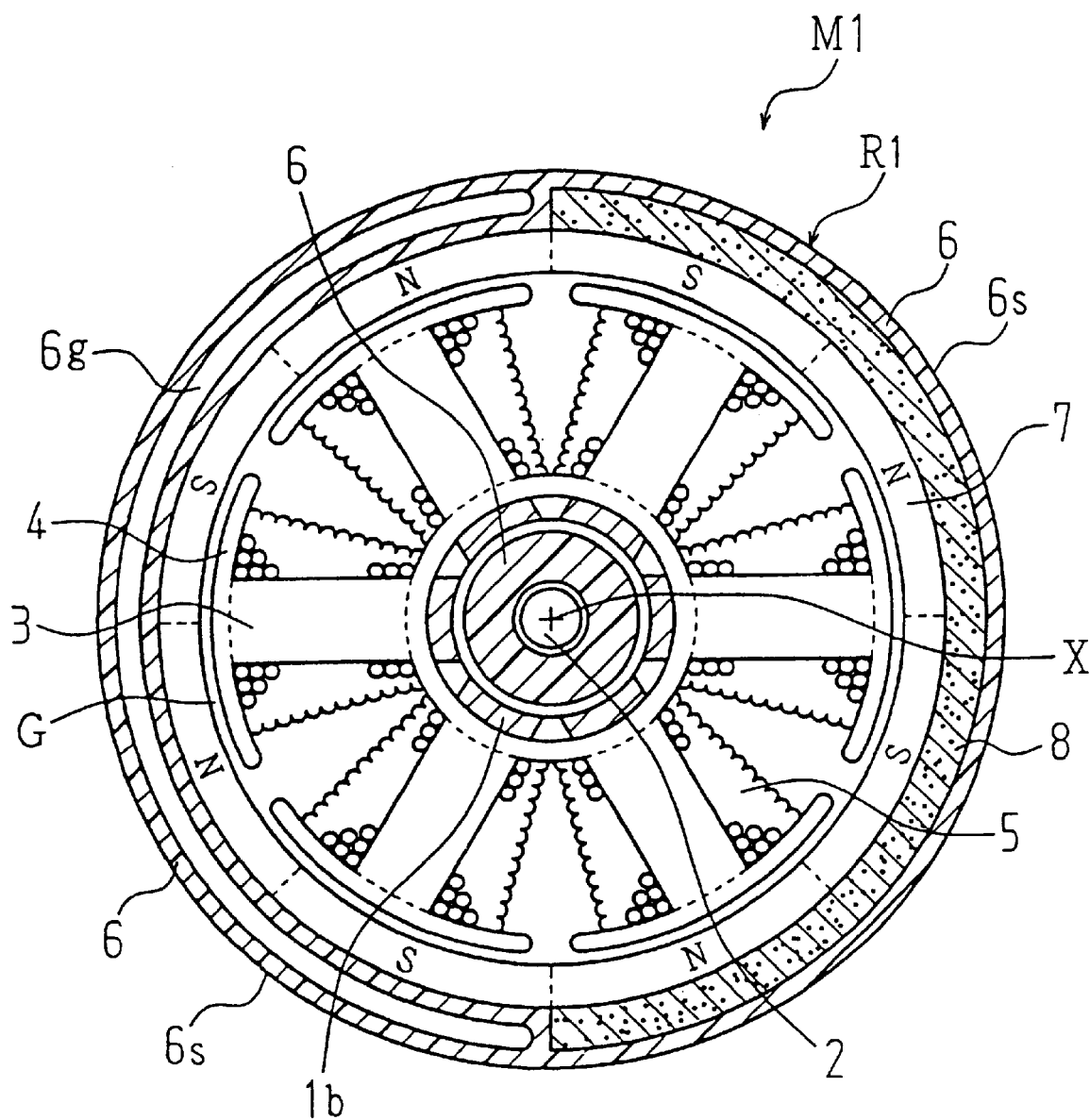
FIG. 2 is a horizontal section taken along lines II—II shown in FIG. 1.
Figure 3:
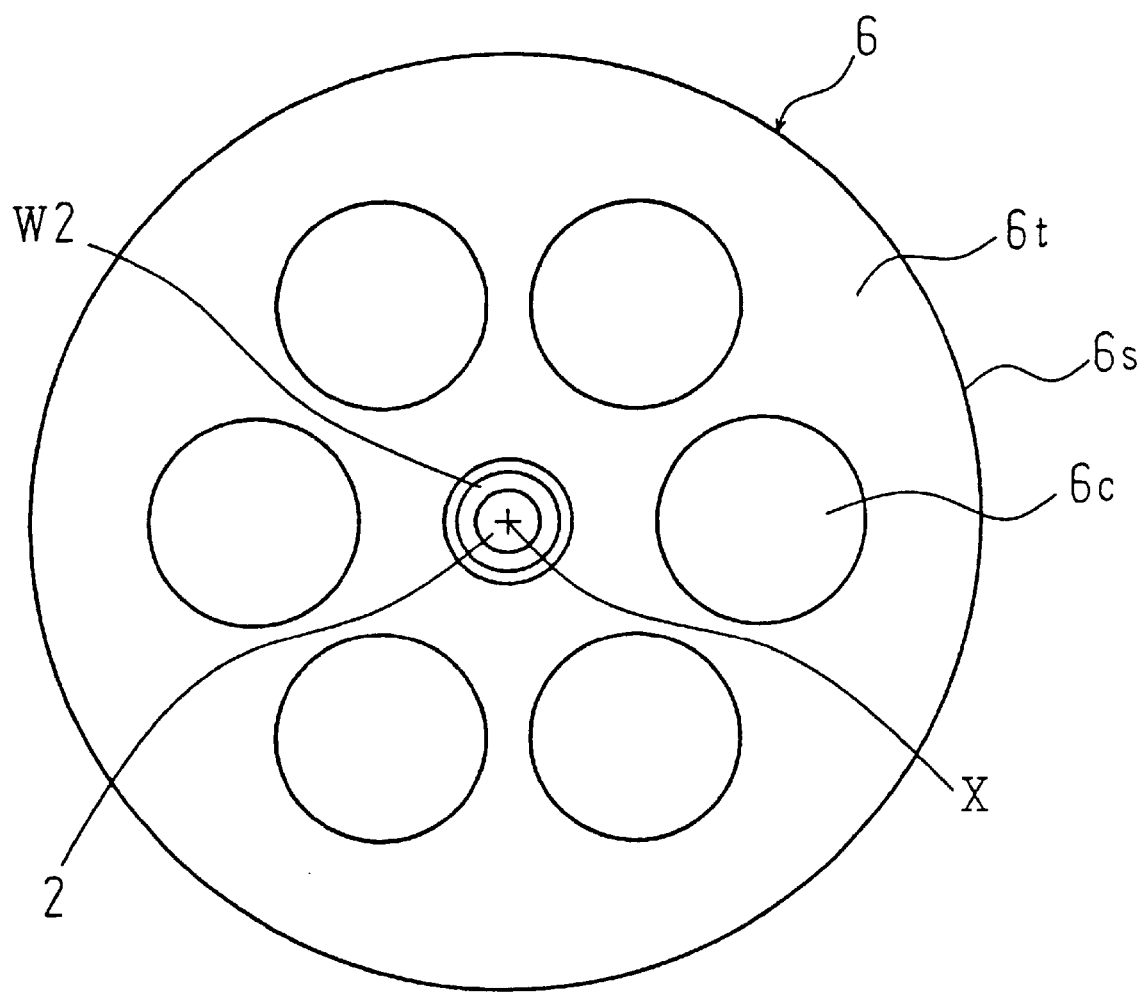
FIG. 3 is a plan view of a magnet holder employed in the vibrator motor shown in FIG. 1.

FIG. 1 shows a vertical section of a vibrator motor M1 of the first embodiment according to the present invention along the rotational axis X of the rotor thereof. FIG. 2 is a horizontal section taken along lines II—II shown in FIG. 1. FIG. 3 is a plan view of a magnet holder employed in the vibrator motor M1.

Referring to FIGS. 1 to 3, the vibrator motor M1 has a base member 1, a shaft 2, having a longitudinal center axis X, fixedly connected to the base member 1, a stator S fixedly connected to the base member 1, a rotor R1 rotatably mounted on the shaft 2, and a flexible wiring plate W fixedly attached onto the base member 1.

The base member 1 has a bracket 1b that is a center part of the base member 1, raised in of a pressing process. The stator S includes six magnetically conductive armature cores 3 that are fixedly attached to the bracket 1b at their radially inner-most ends. The armature cores 3 extend radially outwardly from the bracket 1b and are disposed at an even angular pitch of 60° about the center axis X. Each set of the cores 3 includes a pair of identically-formed members attached to each other back-to-back. The cores 3 have arcuate blades 4 at their radially outer-most ends. Six armature coils 5 are individually mounted on the six sets of cores 3.

The rotor R1 has a round magnet holder 6, a one-piece annular permanent magnet 7 fixedly connected to the magnet holder 6, disposed concentrically with the center axis X and radially outside the stator S so that the magnet 7 opposes the blades 4 of the stator cores 3 leaving an airgap G therebetween.

The magnet holder 6 has a generally flat top part 6t that is disposed orthogonal to the center axis X and a cylindrical side wall 6s that is disposed concentrically with the center axis X. The rotor R1 further has an arcuate metal weight 8 that is fixed to the cylindrical side wall 6s of the magnet holder 6 radially inside thereof and radially outside the annular magnet 7. The annular magnet 7 has a total of six north and south magnetic poles alternately arranged at a uniform angular pitch of 60° about the center axis X.

The magnet holder 6 has an arcuate groove 6g disposed radially inside the cylindrical side wall 6s and radially outside the annular magnet 7 in a manner that the arcuate weight 8 and the arcuate groove 6g are disposed in angularly non-overlapping relation about the center axis X and diametrically opposite to each other with respect to the center axis X. The rotor R1 has an eccentric mass distribution with respect to the center axis X because of the arcuate weight 8 and the arcuate groove 6g.

As shown in FIGS. 1 and 3, the top part 6t of the magnet holder 6 has six round cutouts 6c, i.e. through-holes, disposed at an equal distance from the center axis X and at an even pitch angle of 60° thereabout. The cutouts 6c cause the weight of the magnet holder 6 to be minimized. The number of the cutouts 6c may alternatively be any of one or more. One or more of the cutouts 6c may be arranged only on the side diametrically opposite to the arcuate weight 8 with respect to the center axis X in order to cause the center of mass of the rotor R1 to deviate further from the center axis X.

The magnet holder 6 in this embodiment is made of a low-friction synthetic resin and is rotatably mounted on the shaft 2 in a manner that the resin magnet holder 6 is in a direct sliding contact with the shaft 2. W1 and W2 in FIG. 1 denote a slide washer and a rotor holding washer, respectively.

The six armature coils 5 are energized in sequence with dc power supplied through the wiring plate W in a prior-known method in which different phases of dc pulses are produced in a driver circuit (not shown) and individually supplied to the six coils 5 in proper sequence and timing. The sequence and timing of the pulses outputted from the driver circuit are controlled by a controller (not shown) so as to cause the coils 5 to produce a rotating magnetic flux in the airgap G between the stator S and the rotor R1. The rotating magnetic flux interacts with the magnetic flux produced by the permanent magnet 7 so that the rotor R1 rotates in synchronism with the rotating magnetic flux. Since this method is in the prior art and is not involved in the object of the present invention, no further details thereof will be disclosed.

Since the rotor R1 has an eccentric mass distribution with respect to the center axis X, the motor M1 vibrates as the rotor R1 makes rotation.

Figure 4:
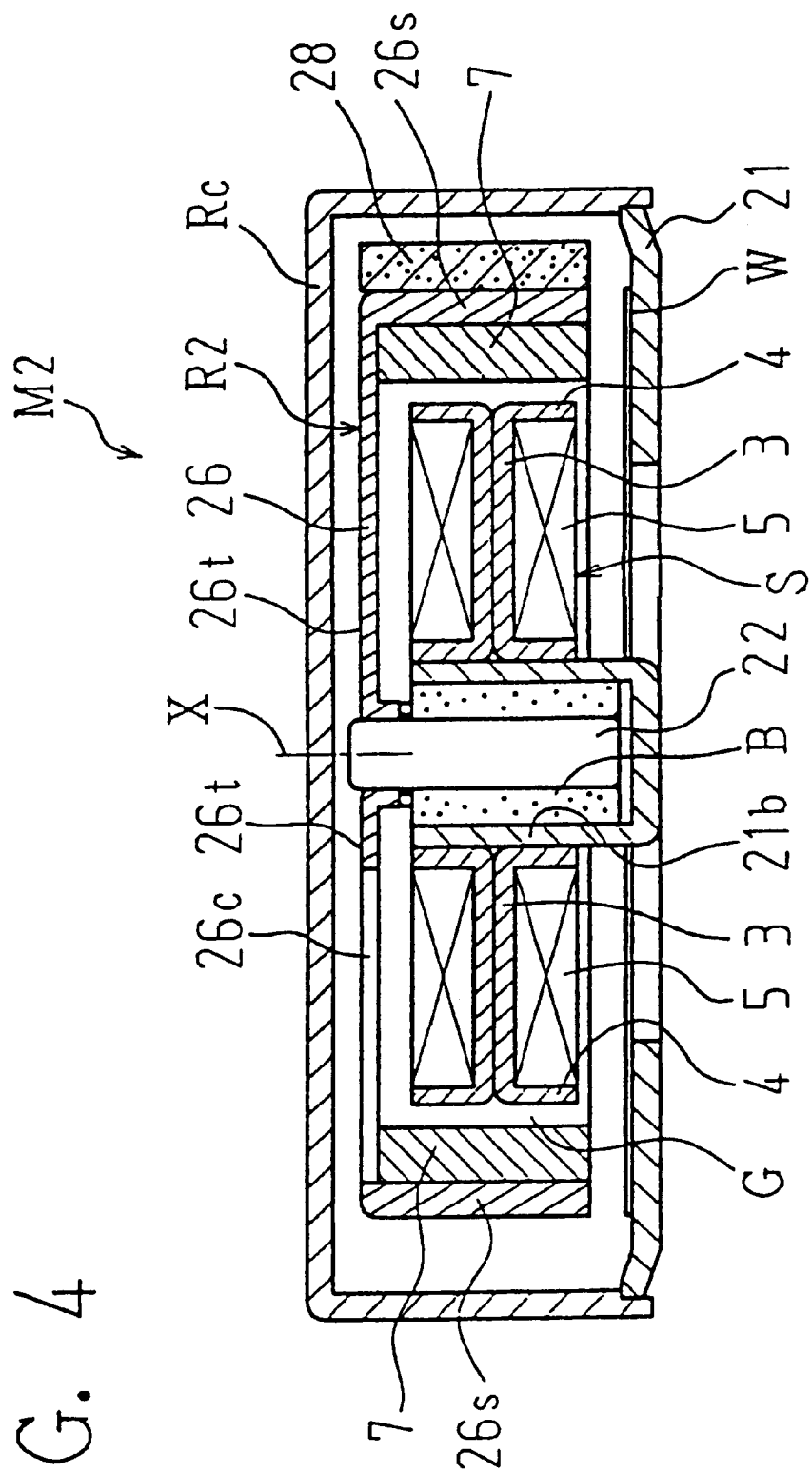
FIG. 4 is a vertical sectional view of a vibrator motor of the second embodiment according to the present invention.
Figure 5:
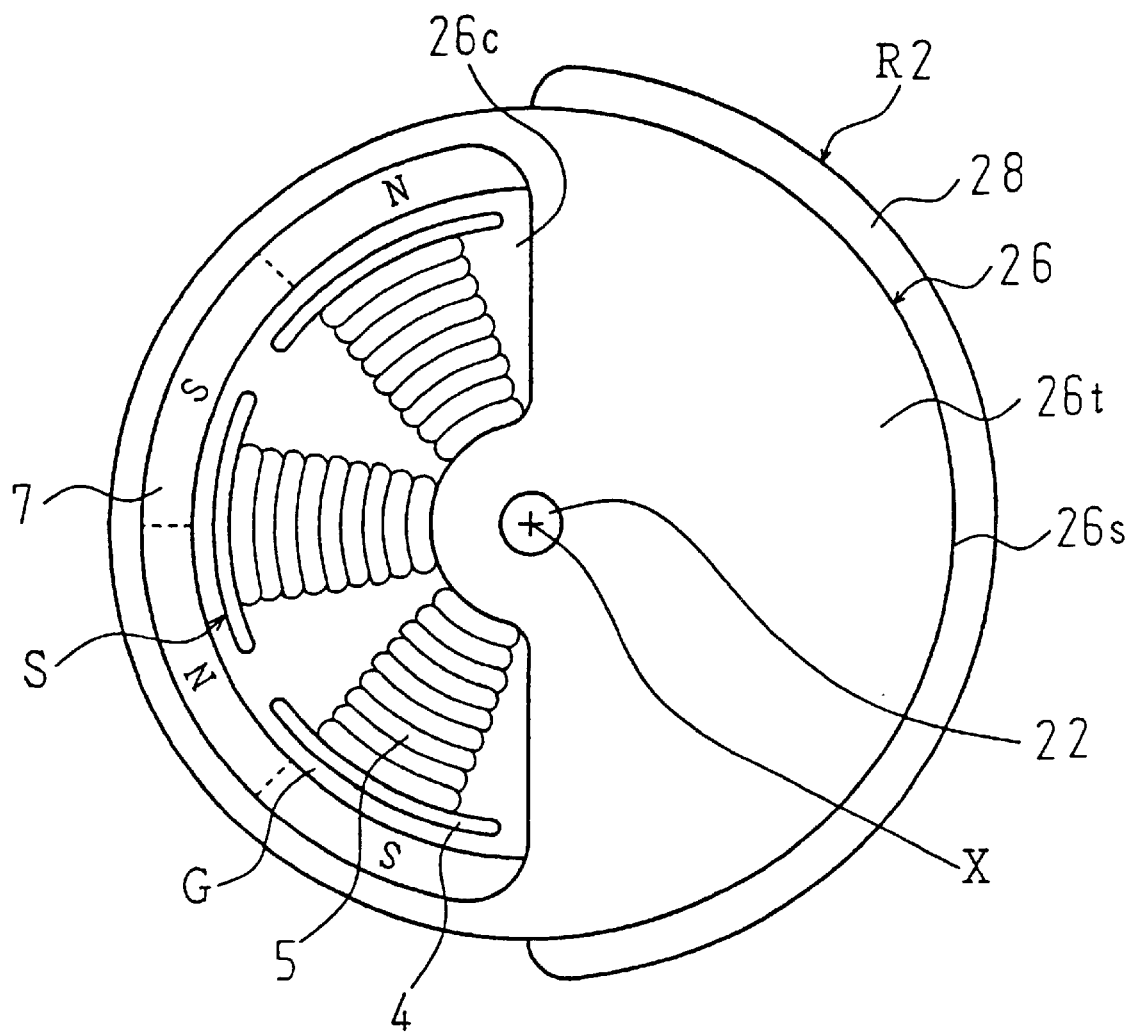
FIG. 5 is a plan view of the rotor and a part of the stator employed in the vibrator motor shown in FIG. 4.

FIG. 4 shows a vertical section of a vibrator motor M2 of the second embodiment according to the present invention along the rotational axis X of the rotor thereof. FIG. 5 is a plan view of the rotor and a part of the stator employed in the vibrator motor M2.

The basic construction and the functional principle of the vibrator motor M2 are similar to those of the vibrator motor M1 of the first embodiment.

Unless otherwise specifically mentioned, it should be understood, throughout this specification, that like reference numerals or characters denote like components or parts, structurally and functionally. No duplicate explanation may, therefore, be made of the components or parts having reference numerals or characters that have already been described above.

Referring to FIGS. 4 and 5, the vibrator motor M2 has a base member 21, a shaft 22, having a longitudinal center axis X, rotatably connected to the base member 21 with an oil-impregnated bearing B, a stator S fixedly connected to the base member 21, a rotor R2 fixedly mounted on the shaft 22, a flexible wiring plate W fixedly attached onto the base member 21, and a cup-like stationary rotor cover Rc fixedly attached to the base member 21.

The base member 21 has a bracket 21b that is a center part of the base member 21, raised by a pressing process. The stator S includes six magnetically conductive cores 3 that extend radially outwardly from the bracket 21b and are disposed at a uniform angular pitch of 60° about the center axis X. Each set of the cores 3 includes a pair of members attached to each other back-to-back. The cores 3 have arcuate blades 4 at their radially outer-most ends. Six armature coils 5 are individually mounted on the six sets of cores 3. Namely, the construction and function of the stator S of the vibrator motor M2 are exactly the same as those of the vibrator motor M1 of the first embodiment.

The rotor R2 has a round magnet holder 26, a one-piece annular permanent magnet 7, which is the same magnet as of the vibrator motor M1, fixedly connected to the magnet holder 26 and disposed concentrically with the center axis X radially outside the stator S, and an arcuate metal weight 28 fixed to the magnet holder 26 and disposed radially outside the annular magnet 7 and the magnet holder 26. As shown in FIGS. 4 and 5, the arcuate metal weight 28 is fixed to the magnet holder 26, axially extending within the rotor R2, farther from the center axis X than the annular permanent magnet 7, and has a height along the axial direction which is substantially the same as the height of the rotor R2. As shown in FIGS. 1 and 4, in various embodiments, the arcuate weight 28 can be located on either side of the wall of the magnet holder 26, farther from or closer to the central axis X than the wall of the magnet holder. The annular magnet 7 has a total of six north and south magnetic poles alternately arranged at an even pitch of 60° about the center axis X.

The round magnetic holder 26 includes a generally flat top part 26t that is orthogonal to the center axis X and a cylindrical side wall 26s concentric with the center axis X. The top part 26t has a generally sectorial cutout 26c, which is a through-hole. The annular magnet 7 is disposed radially inside the cylindrical side wall 26s and the arcuate weight 28 is disposed radially outside the side wall 26s. The arcuate weight 28 and the cutout 26c are disposed in angularly non-overlapping relation about the center axis X and diametrically opposite to each other with respect to the center axis X, as better shown in FIG. 5. The rotor R2 has an eccentric mass distribution with respect to the center axis X because of the arcuate weight 28 and the cutout 26c.

The magnet holder 26 is made of a magnetically conductive material, but, alternatively, it may be made of a synthetic resin.

The rotor cover Rc is fixedly connected to the base member 21 in a manner that the rotor R2 is protectively capped with the rotor cover Rc.

The operational principle of the vibrator motor M2 is identical to that of the vibrator motor M1, which is a prior known art. No duplicate explanation thereon will, therefore, be made.

Figure 6:
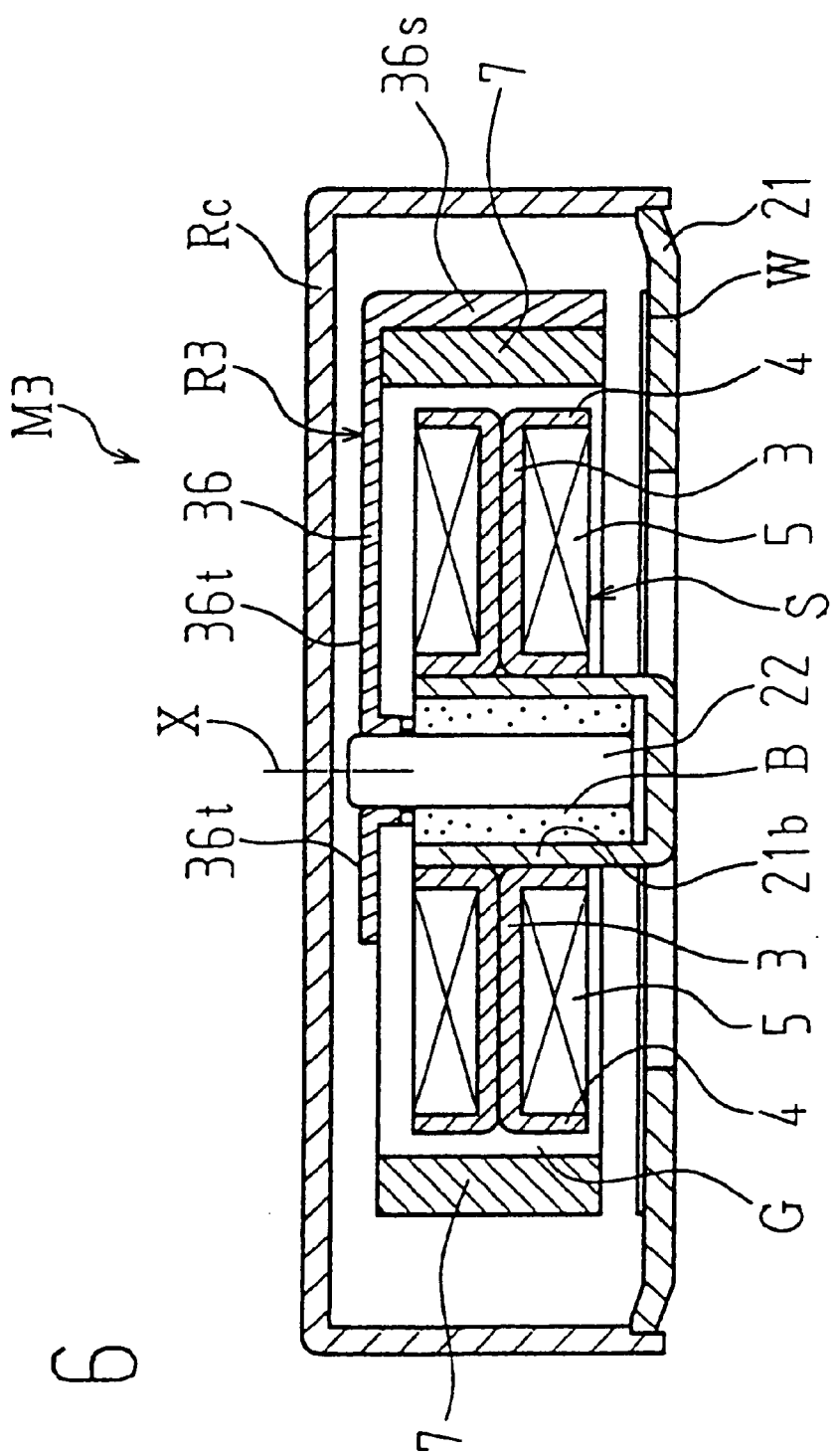
FIG. 6 is a vertical sectional view of a vibrator motor of the third embodiment, which is alternative to the second embodiment, according to the present invention.
Figure 7:
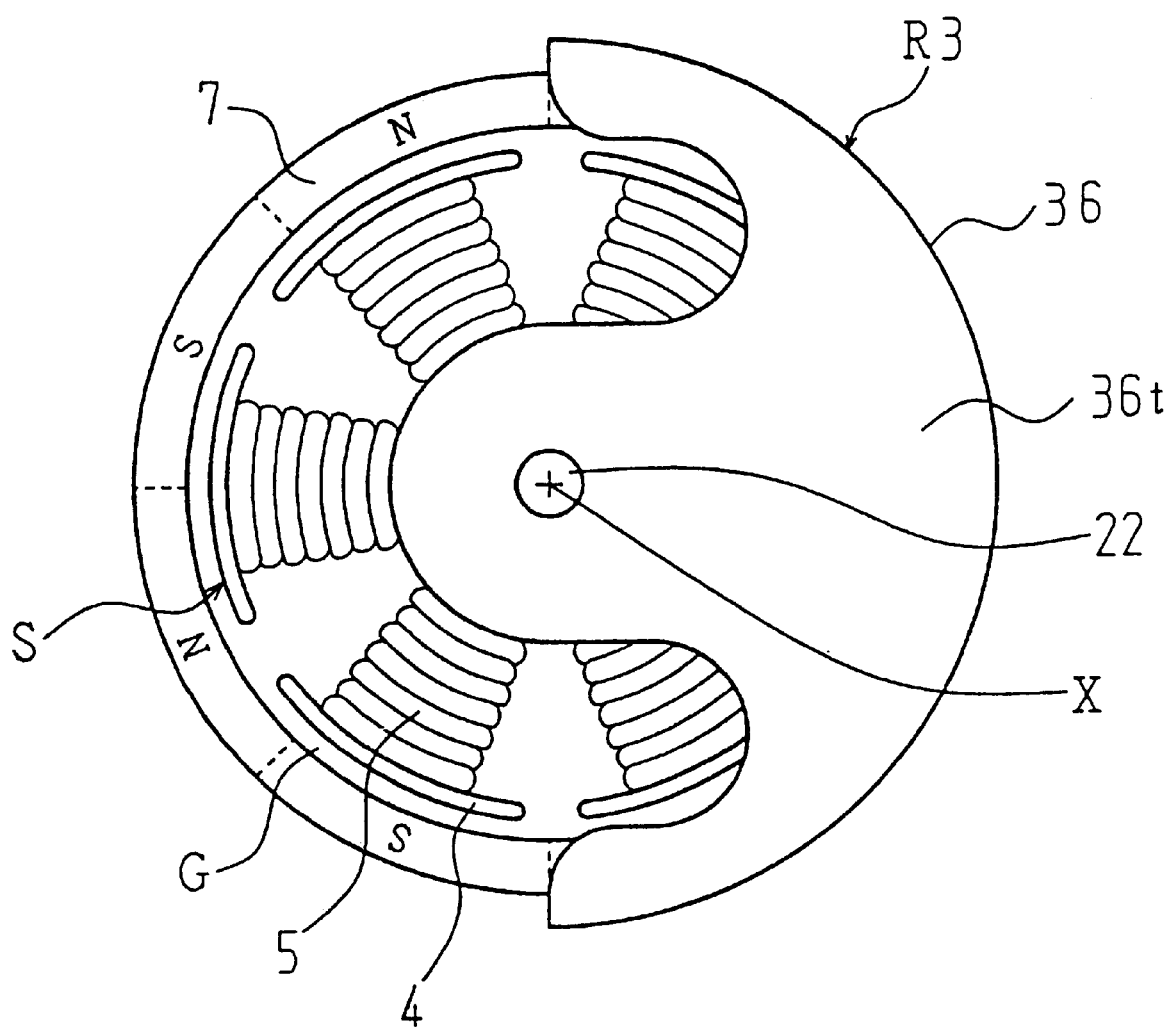
FIG. 7 is a plan view of the rotor and a part of the stator employed in the vibrator motor shown in FIG. 6.

FIG. 6 is a vertical sectional view of a vibrator motor M3 of the third embodiment, which is alternative to the the vibrator motor M2 of the second embodiment, and FIG. 7 is a plan view of the rotor and a part of the stator employed in the vibrator motor M3.

Referring to FIGS. 6 and 7, the vibrator motor M3 has a construction identical to that of the vibrator motor M2 except that the construction of its rotor R3 is slightly different. Explanation will, therefore, be made of the rotor R3 only.

The rotor R3 has a magnet holder 36, a one-piece annular permanent magnet 7, which is identical to that of the vibrator motor M1 or M2, fixedly connected to the magnet holder 36 and disposed concentrically with the center axis X radially outside the stator S, which is also identical to that of the vibrator motor M1 or M2. The rotor R3 has no arcuate metal weight such as the one included in the rotor R2 of the vibrator motor M2.

As better shown in FIG. 7, diametrically about one half of the magnet holder 36 is cut out. The magnet holder 36 has a generally flat top part 36t, which is disposed orthogonal to the center axis X, and a side wall 36s having a form of a part of a cylinder. The top part 36t has a generally anchor form as viewed from its top. The magnet holder 36 itself has, therefore, an eccentric mass distribution with respect to the center axis X, whereby the rotor R3 has an eccentric mass distribution as well. Only a part (angularly 180° about the center axis X) of the annular magnet 7 is covered by the top part 36t of the magnet holder 36 on its top and by the side wall 26s thereof on its radially outside, and angularly the other half part of the magnet 7 is exposed without being covered or adjoined by the magnet holder 36. Nevertheless, the one-piece annular magnet 7 has enough physical strength so as to withstand the centrifugal force when the rotor R3 rotates. As in the case of vibrator motor M1 or M2, the annular magnet 7 has a total of six north and south magnetic poles alternately arranged at a uniform angular pitch of 60° about the center axis X.

Since the operational principle of the vibrator motor M3 is identical to those of the vibrator motor M1 or M2, no duplicate explanation will be made.

While the rotor R2 or R3 is in rotation, the magnetic interaction between the stator S and the magnet 7 keeps the rotor R2 or R3 from axially moving upwardly (as viewed in FIG. 4 or 6) and touching the rotor cover Rc. No key or stopper is, therefore, required to keep the shaft from slipping axially while operation.

It will be understood that various changes and modifications may be made in the above described embodiments which provide the characteristics of the present invention without departing from the spirit and principle thereof particularly as defined in the following claims.

What is claimed is:

1. A dc brushless vibrator motor, comprising:
   a base member;
   a shaft supporting portion fixed to said base member and having a longitudinal center axis;
   a stator connected to said base member, said stator having a plurality of magnetically conductive cores and a plurality of blades uniformly arranged around the center axis and an armature coil mounted at each of said magnetically conductive cores;
   a rotor mounted on a shaft retained in said shaft supporting portion and having an eccentric mass distribution with respect to the center axis, said rotor having
   a magnet holder with a first part having a height parallel to the center axis and a second part perpendicular to the center axis and having a flat top with a through hole,
   an annular permanent magnet fixedly connected to at least the first part of said magnet holder, and
   an arcuate metal weight fixed to said magnet holder, axially extending farther from the center axis than said annular permanent magnet and having a height parallel to the center axis substantially equal to the height of the first part of said magnet holder, said annular permanent magnet having a plurality of magnetic poles arranged at a uniform angular pitch around the center axis; and
   a cup-shaped rotor cover on said base member covering said rotor to prevent foreign matter from entering through the through hole.

2. The dc brushless vibrator motor according to claim 1, wherein said magnet holder is a synthetic resin and is rotatably mounted on said shaft with said resin magnet holder in direct sliding contact with said shaft.

3. A dc brushless vibrator motor, comprising:
   a base member;
   a shaft connected to said base member, said shaft having a longitudinal center axis;
   a stator fixedly connected to said base member, said stator having a plurality of magnetically conductive cores uniformly angularly disposed about the center axis and respective armature coils mounted on said stator; and a rotor mounted on said shaft and having an eccentric mass distribution with respect to the center axis, said rotor having a magnet holder and an annular permanent magnet fixedly connected to said magnet holder, concentric with the center axis, and located radially outside said stator, said magnet holder having a cutout in a part thereof so that said magnet holder has an eccentric mass distribution with respect to the center axis, said annular permanent magnet having alternating north and south magnetic poles arranged at a uniform angular pitch about the center axis, said rotor additionally having an arcuate weight fixedly attached to said magnet holder radially outside said annular permanent magnet.

4. The dc brushless vibrator motor according to claim 3, wherein said magnet holder is a magnetically conductive materials.

5. The dc brushless vibrator motor according to claim 3, further comprising a cup-like stationary rotor cover fixed to said base member and protectively capping said rotor.

6. The dc brushless vibrator motor according to claim 3, wherein said magnet holder has a generally flat top orthogonal to the center axis and the cutout is a through-hole in said flat top.

7. The dc brushless vibrator motor according to claim 6, wherein said arcuate weight and the through-hole are disposed diametrically opposite to each other with respect to the center axis.

8. The dc brushless vibrator motor according to claim 7, wherein the through-hole is generally sector-shaped.

9. The dc brushless vibrator motor according to claim 6, wherein said magnet holder has a cylindrical part concentric with the center axis and said annular permanent magnet is fixedly adjoined by said cylindrical part and radially outside said cylindrical part.

* * * * *